United States Patent [19]

Tripod

[11] Patent Number: 5,179,320
[45] Date of Patent: Jan. 12, 1993

[54] SIGNAL ADAPTIVE BEAM SCAN VELOCITY MODULATION

[75] Inventor: Luc Tripod, Zurich, Switzerland

[73] Assignee: RCA Thomson Licensing Corporation, Princeton, N.J.

[21] Appl. No.: 746,014

[22] Filed: Aug. 14, 1991

[30] Foreign Application Priority Data

Aug. 20, 1990 [GB] United Kingdom ............... 9018218
Feb. 4, 1991 [GB] United Kingdom ............... 9102365

[51] Int. Cl.$^5$ ........................ H01J 29/70; H01J 29/76
[52] U.S. Cl. .................................................. 315/399
[58] Field of Search ............... 315/399, 408; 358/242, 358/166

[56] References Cited

U.S. PATENT DOCUMENTS

| | | | |
|---|---|---|---|
| 3,946,153 | 3/1976 | Peth et al. | 178/7.1 |
| 4,080,628 | 3/1978 | Jirka | 358/166 |
| 4,170,785 | 10/1979 | Yoshida et al. | 358/242 |
| 4,185,301 | 1/1980 | Mitsuda et al. | 358/242 |
| 4,261,014 | 4/1981 | Lee | 358/166 |
| 4,309,725 | 1/1982 | Groeneweg | 358/242 |
| 4,641,195 | 2/1987 | Inoue et al. | 358/242 |
| 5,093,728 | 3/1992 | Altmanshofer | 358/242 |

FOREIGN PATENT DOCUMENTS

| | | |
|---|---|---|
| 53-49304 | 11/1978 | Japan . |
| 63-164764 | 7/1988 | Japan . |
| 2-36677 | 2/1990 | Japan . |

OTHER PUBLICATIONS

Yoshida et al., Achievement of High Picture Quality in Color CRTs with the Beam-Scan Velocity Modulation Method, IEEE Transactions on Consumer Electronics, vol. CE-23, No. 3, Aug. 1977.

Haenen et al., Scan-Velocity Modulation Increases TV Picture Sharpness, Electronic Components and Applications, vol. 4, No. 1, Nov. 1981.

"Sony 27" color Monitor KC-27HV2, Television Technology, Apr. 1991, pp. 31-36, Yoshiro Kaneko et al., and translation.

Primary Examiner—Theodore M. Blum
Attorney, Agent, or Firm—Joseph S. Tripoli; Joseph J. Laks; Harvey D. Fried

[57] ABSTRACT

A deflection system comprises a variable gain amplifier for a luminance component of a video signal. A first differentiator differentiates the amplified luminance component. An output amplifier modulates beam scan velocity of an electron beam by energizing an auxiliary horizontal deflection yoke responsive to the differentiated luminance component. A second differentiator differentiates the differentiated luminance component. An integrator integrates the twice differentiated luminance component. The output of the integrator is a gain control signal. The variable gain amplifier has a gain which varies responsive to the gain control signal. The gain varies inversely with the frequency content of the luminance component. The second differentiator and integrator form a feedback loop. The feedback loop has a sufficiently large time constant relative to level transitions of the luminance component that the deflection signal corresponds to the first derivative of the luminance component independent of the variable gain.

34 Claims, 5 Drawing Sheets

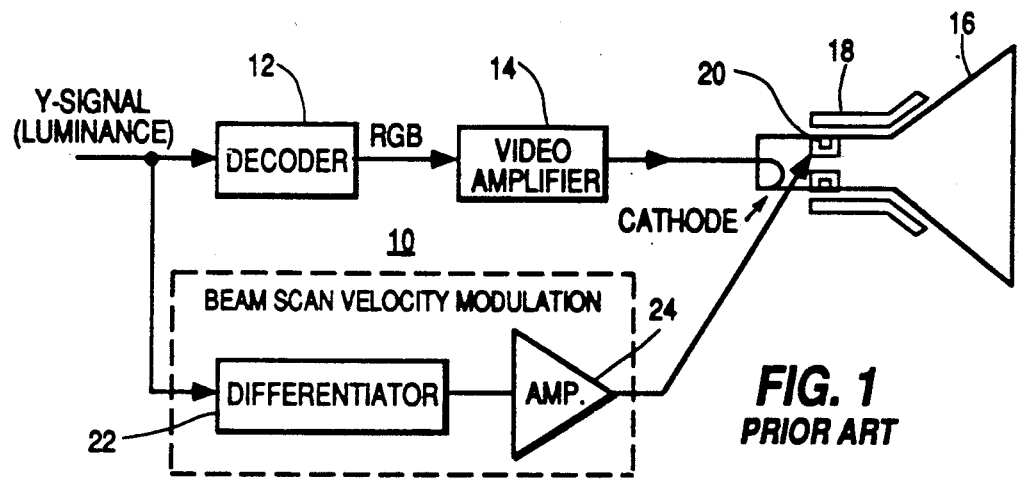
FIG. 1
PRIOR ART
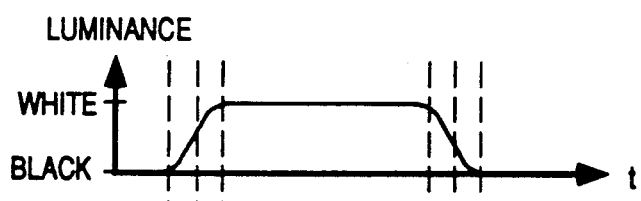
FIG. 2(a)
FIG. 2(b)
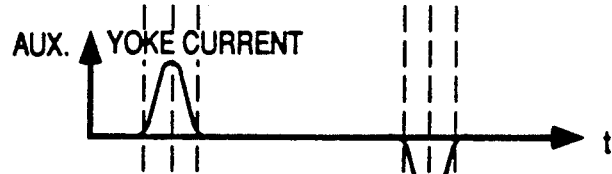
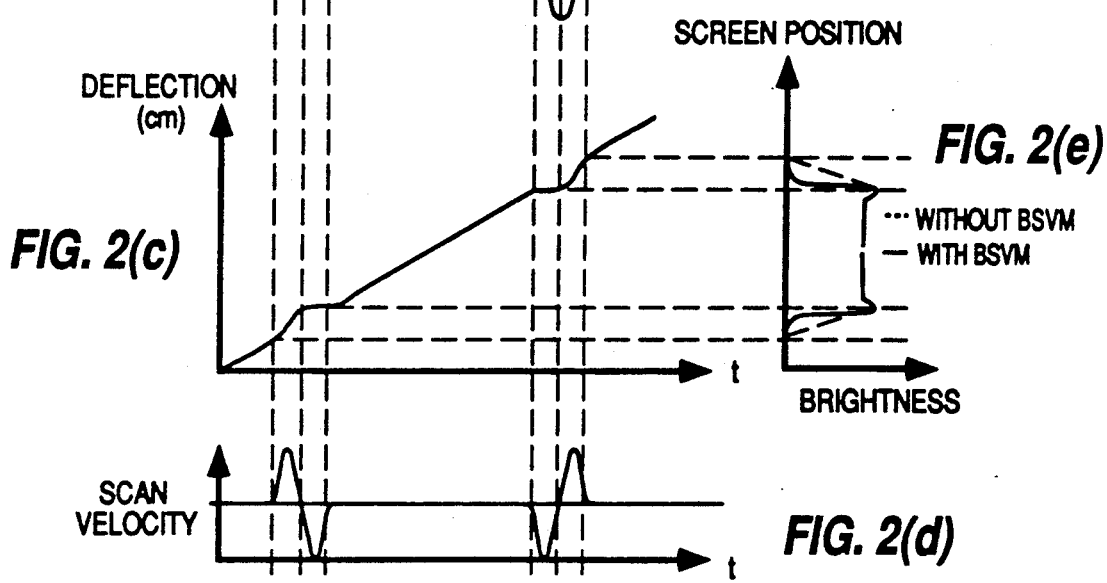
FIG. 2(c)
FIG. 2(d)
FIG. 2(e)
··· WITHOUT BSVM
— WITH BSVM

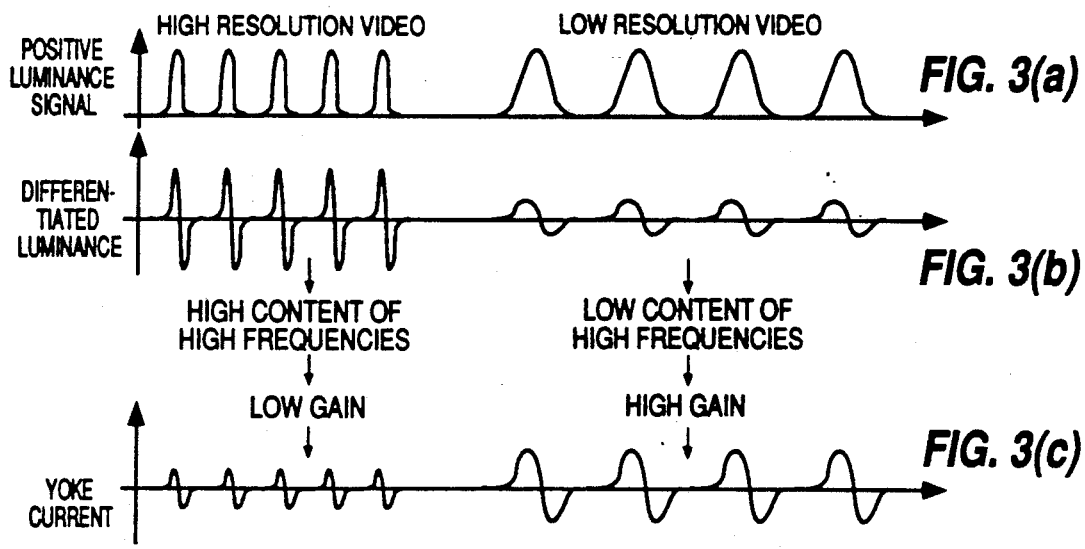
FIG. 3(a)
FIG. 3(b)
FIG. 3(c)
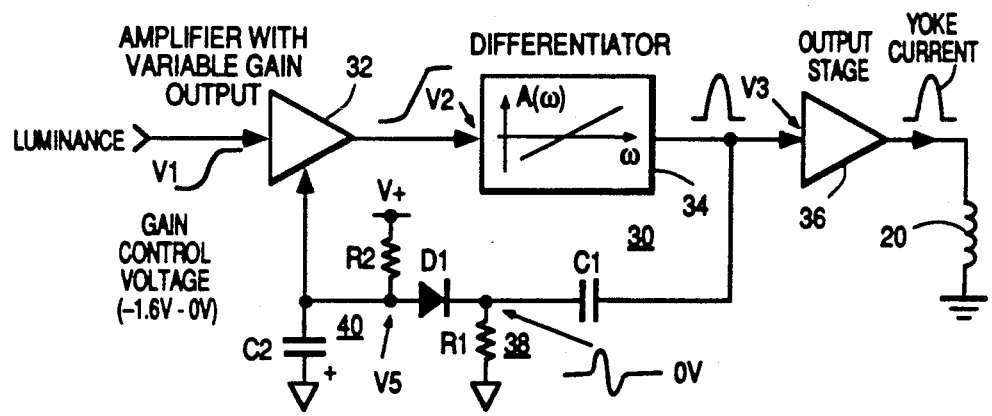
FIG. 4

SIGNAL ADAPTIVE BEAM SCAN VELOCITY MODULATION

BACKGROUND OF THE INVENTION

1. Field of the Invention

This invention relates to the field of beam scan velocity modulation for cathode ray tubes in televisions and the like.

2. Description of Related Art

Beam scan velocity modulation (BSVM) can be used in color television sets, for example large screen television sets and/or television sets with sophisticated display features and high resolution, to improve horizontal resolution of the picture. FIG. 1 illustrates a block diagram of a deflection circuit 10 using a basic BSVM circuit according to the prior art. The circuit 10 has a main luminance processing path comprising an RGB decoder 12, a video amplifier 14 and a picture tube 16. The picture tube 16 has a main deflection yoke 18 and an auxiliary deflection yoke 20. Beam scan velocity modulation is provided by a differentiator 22 and an amplifier 24. The luminance signal is differentiated and applied to the auxiliary yoke 20 mounted on the neck of the picture tube 16 under the main yoke 18. The horizontal deflection field is modulated by the current in the auxiliary yoke, and hence the scan velocity is modulated. A black to white transiton followed by a white to black transition for a luminance signal is shown in FIG. 2(a). The auxiliary yoke current shown in FIG. 2(b) increases during the first part of the leading edge of the black to white transition, and decreases during the second part of the black to white transition. A corresponding but negative auxiliary yoke current flows during the white to black transition. The effects of the auxiliary deflection current on the deflection and scan velocity are shown in FIGS. 2(c) and 2(d) respectively. An increase of scan velocity reduces brightness while a decrease raises brightness on the screen. The result is a rapid change in image brightness distribution so that a transition appears sharper, as shown in FIG. 2(e), where the solid line shows brightness with BSVM and the dashed line shows brightness without BSVM. The much sharper transition is evident for BSVM. The advantage of BSVM lies in emphasizing image contours without increasing beam current. The spot size is therefore not enlarged.

The disadvantage of such a simple system is that visible sharpness improvement is only obtained for high resolution test pictures and text. This is due to the differentiator, which emphasizes the higher frequencies. While high resolution pictures are enhanced, pictures of normal or low resolution, which particularly need improvement, are not enhanced.

SUMMARY OF THE INVENTION

Low resolution pictures can be improved by raising the amplitude of the correction signal. However, excessive correction would result from processing high definition pictures, causing visible artifacts. In accordance with an aspect of the invention, the solution to the problem is to use a higher deflection correction amplitude only for pictures with slow transitions. A BSVM circuit according to an aspect of the invention incorporates a variable gain amplifier controlled by the frequency content of the luminance signal, instead of a fixed gain amplifier as used in prior art BSVM circuits. The effect of the new BSVM circuit taught herein is to increase the gain of the BSVM circuit with decreasing high frequency content of the luminance signal, resulting in an improvement of sharpness both for high resolution and low resolution pictures. The BSVM is therefore adaptive to the video signal, and in particular, to the frequency content of the luminance component of the video signal. The operation of the new BSVM circuit is illustrated in FIGS. 3(a), 3(b) and 3(c).

A first differentiator in the BSVM signal processing path produces narrow pulses from the luminance transitions. These pulses are amplified and applied to an auxiliary yoke for scan velocity modulation. A second differentiator in the control circuit produces pulses of both polarities from the single polarity pulses. Regardless of the polarity of the single polarity pulses, negative pulses for application to the integrator are thus always available. A control voltage in an operating range is generated by the integrator for controlling the variable gain stage. The gain of the variable gain stage is reduced as the control voltage becomes more negative.

The gain control voltage is proportional to the negative peak amplitude of the second derivative of the luminance signal. The gain is reduced instantaneously with the appearance of high frequencies, for example steep transients and multiburst, in the luminance signal. If the high frequency content of the luminance signal diminishes, for example by a change from a test pattern to low resolution program material, the amplitude of the signal from the integrator will decrease. The gain control voltage increases until stabilizing at a new, higher level. The circuit avoids excessive gain variations to prevent noise enhancement in large picture regions without transitions.

BRIEF DESCRIPTION OF THE DRAWINGS

FIG. 1 is a block diagram of a deflection circuit using a basic BSVM circuit according to the prior art.

FIGS. 2(a)-2(e) are waveforms useful for explaining the operation of the circuit shown in FIG. 1.

FIGS. 3(a)-3(c) are waveforms useful for explaining the effect of frequency dependent gain on BSVM.

FIG. 4 is a block diagram of a BSVM circuit according to an inventive arrangement.

DETAILED DESCRIPTION OF THE PREFERRED EMBODIMENTS

Figure 5:
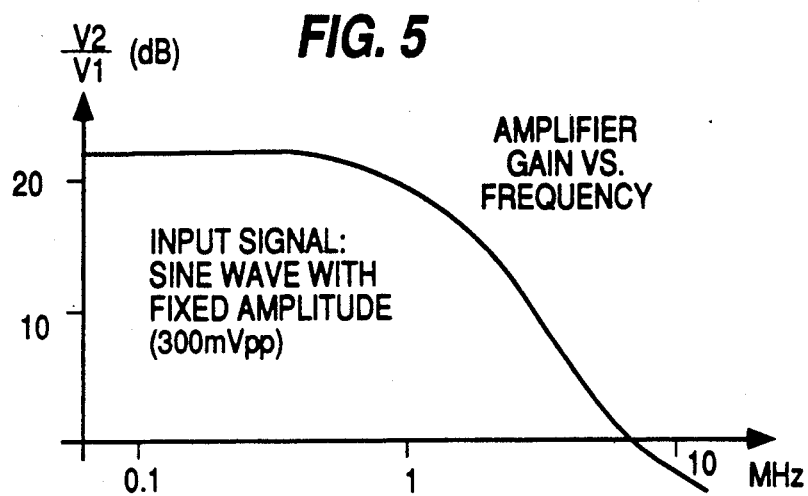
FIG. 5 is a waveform useful for illustrating amplifier gain vs. frequency for the circuit shown in FIG. 4.

Beam scan velocity modulation according an inventive arrangement is illustrated graphically in FIGS. 3(a), 3(b) and 3(c). Luminance signals for high and low resolution video, corresponding to higher and lower frequency content respectively, but of the same maximum amplitude, are shown in FIG. 3(a). The result of differentiating the signals of FIG. 3(a) is shown in FIG. 3(b). The high resolution video evidences the high proportion of high frequency information in the luminance signal, noted as high content of high frequencies in FIG. 3(b). The low resolution video evidences the low proportion of high frequency information in the luminance signal, noted as low content of high frequencies in FIG.

3(b). In accordance with an inventive arrangement, the gain of the BSVM circuit increases with the decreasing high frequency content of the luminance signal, as shown in FIG. 3(c), resulting in improved sharpness for both high and low resolution pictures.

A block diagram of a BSVM circuit 30 according to an inventive arrangement is shown in FIG. 4. The BSVM circuit 30 utilizes a variable gain amplifier stage 32 with an associated control circuit, instead of the fixed gain amplifier used in prior art BSVM circuits. The control circuit comprises a second differentiator 38 and an integrator 40.

A differentiator 34 in the BSVM signal processing path produces narrow pulses V3 from the luminance transitions V1 and V2. The pulses V3 are amplified by output stage 36 and applied to the auxiliary yoke 20 for scan velocity modulation. The second differentiator 38, formed by capacitor C1 and resistor R1, produces pulses V4 of both polarities from the single polarity pulses V3. Regardless of the polarity of pulses V3, negative pulses for application to the integrator 40, formed by diode D1 and capacitor C2, are thus always available. Diode D1 is biased toward conduction by the voltage V+ and the consequent very small current through resistor R2. This lowers the conduction threshold of diode D1 in order to make the integrator 40 more sensitive to small amplitudes of signal V4. A voltage V5 in the range of approximately −1.6 volts to 0 volts DC is generated by the integrator 40 for controlling the variable gain amplifier stage 32. The gain of amplifier stage 32 is reduced as the control voltage becomes more negative.

The gain control voltage V5 is proportional to the negative peak amplitude of the second derivative of the luminance signal. The gain is reduced virtually instantaneously with the appearance of high frequencies, for example steep transients and multiburst, in the luminance signal. If the high frequency content of the luminance signal diminishes, for example by a change from a test pattern to low resolution program material, the amplitude of signal V4 will decrease. With reference again to FIGS. 3(a) and 3(b), the luminance signal for high resolution video has faster, steeper rising and falling edges than in the case of the luminance signal for the low resolution video. Accordingly, the pulses of the differentiated signal V3 will have higher amplitudes for high resolution video than for low resolution video. Therefore, the dual polarity pulses V4 generated by the second differentiator 38 will have higher peak amplitudes, both positive and negative, for high resolution video than for low resolution video. Thus, the amplitude of signal V4 decreases when the video signal changes from high resolution video to low resolution video. Capacitor C2 slowly (on the order of 1 volt/sec) discharges through resistor R2 in the absence of negative peaks, the control voltage V5 rises and the gain increases until signal V4 is large enough to recharge capacitor C2. The gain control voltage will then stabilize at a new, higher level. The long control loop time constant (on the order of 0.5 sec) avoids excessive gain variations during each field to prevent noise enhancement in large picture regions without transitions.

The BSVM signal amplification has an upper limit to prevent excessive correction (exceeding ±1 mm on a 32″ screen), causing picture distortion. In the case of BSVM, picture distortion appears as a change of width of black or white picture details.

FIG. 5 shows the steady state gain of the variable gain amplifier as a function of frequency. The time constant of the feedback loop is large (greater than 1 field period) compared to the duration of video transitions. Consequently, the gain variations are very slow compared to the video transitions. The shape of the yoke current thus always corresponds to the first derivative of the luminance, independent of the controlled gain. This is necessary for proper BSVM operation.

Figure 7:
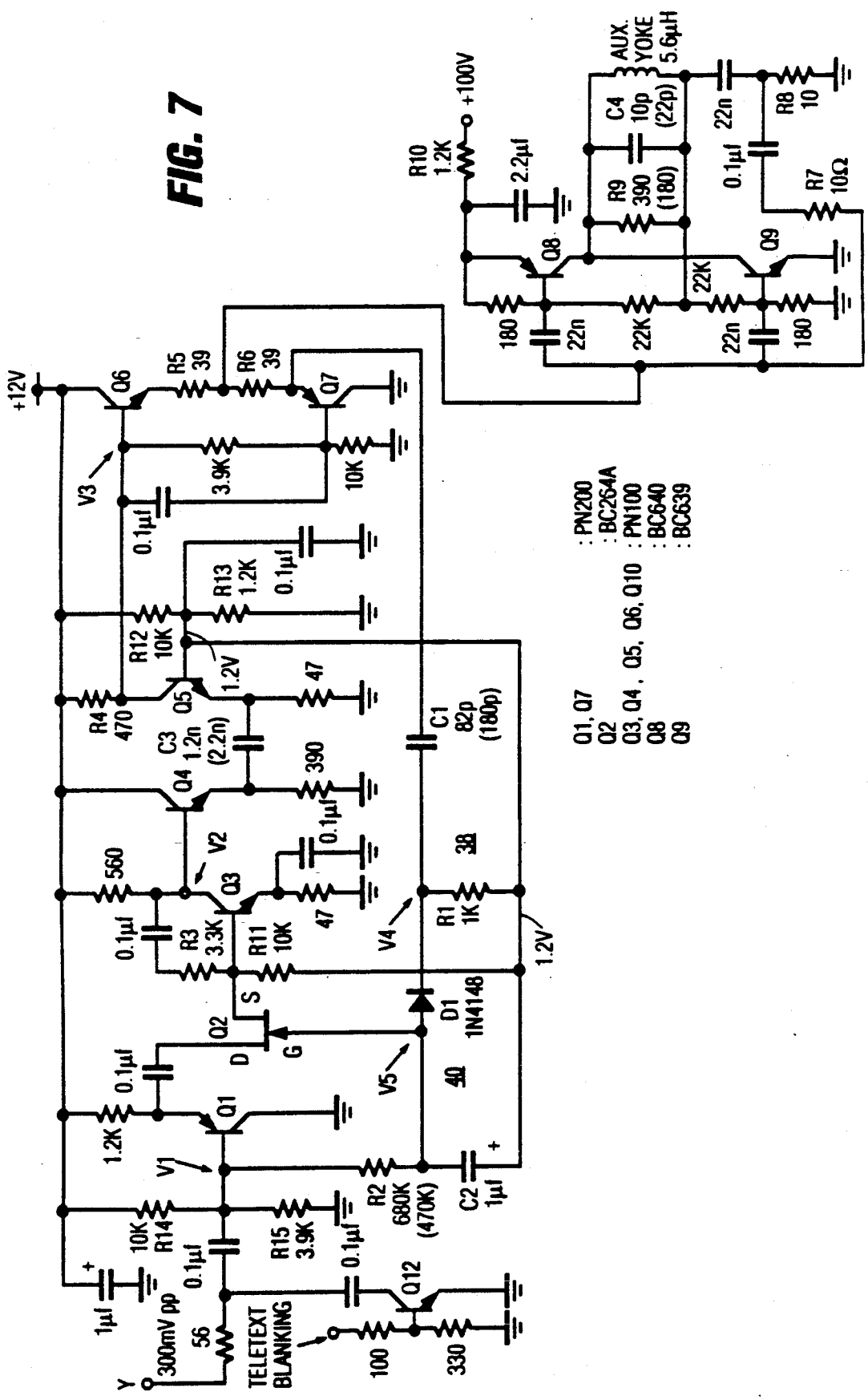
FIG. 7 is a schematic for a BSVM circuit according to an inventive arrangement.

FIG. 7 is a circuit schematic for a BSVM according to an aspect of the invention and adapted for 100 Hz field frequency operation. The required circuit modifications for use in a 50 Hz color television chassis are indicated by the values in parentheses, where appropriate. Component values are provided as well for those components which are not necessary for understanding the operation of the invention. The input signal is the luminance signal available at a suitable point in the video amplifier chain, for example at the input of the video processor integrated circuit. The signal must be completely free of any chrominance components.

The amplifier 32 with a variable gain output is embodied by transistors Q1, Q2 and Q3. Transistor Q1 is an emitter follower which functions as an input buffer. Transistor Q2 is used as a variable resistor RDS (Drain-Source) to control the AC gain in connection with transistor Q3. Transistor Q3 has a fixed gain. An arrangement of variable gain transistors can be utilized instead, as can a variable gain amplifier incorporated as an integrated circuit. An alternative circuit arrangement for an amplifier with a variable gain output is explained in connection with FIG. 8.

A 1.2 volt DC voltage source is established by resistors R12 and R13. The source of transistor Q2, and the base of transistor Q3, are held on this 1.2 volt DC level by resistor R11. The control voltage V5 is superimposed on the same 1.2 volt DC voltage source, that is, control voltage V5 is equal to the voltage across capacitor C2 substracted from the 1.2 volt DC level. The voltage across capacitor C2 depends upon the negative voltage portions of signal V4 which are rectified by diode D1. The control voltage V5 is applied to the gate of the N-channel J-FET Q2. As the high frequency content of the luminance signal increases (for example, high resolution video), signal V4 has greater negative peak amplitudes and the voltage across capacitor C2 increases, resulting in a decrease of control voltage V5. This decreases the conduction of transistor Q2 and attenuates signal V1 to decrease BSVM. Conversely, as the high frequency content of the luminance signal decreases (for example, low resolution video), signal V4 has smaller negative peak amplitudes and the voltage across capacitor C2 decreases, resulting in an increase of control voltage V5. This increases the conduction of transistor Q2 to reduce the attenuation of signal V1 to increase BSVM. In accordance with the range of control voltage shown in FIG. 4, the voltage across capacitor C2 will vary from 1.2 volts to 2.8 volts. The V+ voltage in the embodiment of FIG. 4 for increasing the sensitivity of diode D1 is provided in the embodiment of FIG. 7 by resistors R14 and R15, which also establish the DC bias level for the base of transistor Q1.

The differentiator is embodied by transistors Q4 and Q5, capacitor C3 and resistor R4. Transistors Q6 and Q7 are complementary emitter followers driving the output stage. The output stage is a feedback class C push-pull amplifier, formed by transistors Q8 and Q9. A feedback signal is developed across resistor R8. The feedback is necessary to minimize the delay of this stage. The class C mode of operation automatically provides coring of noise and low level signals due to its small signal threshold. The gain of the output stage, expressed by the yoke current as a function of the input voltage V3, is about 50 mA/volt.

The output signal from the teletext decoder is not included in the input signal of the BSVM circuit. Thus, the circuit must be disabled during teletext operation. This is accomplished with switch formed by transistor Q12.

Figure 8:
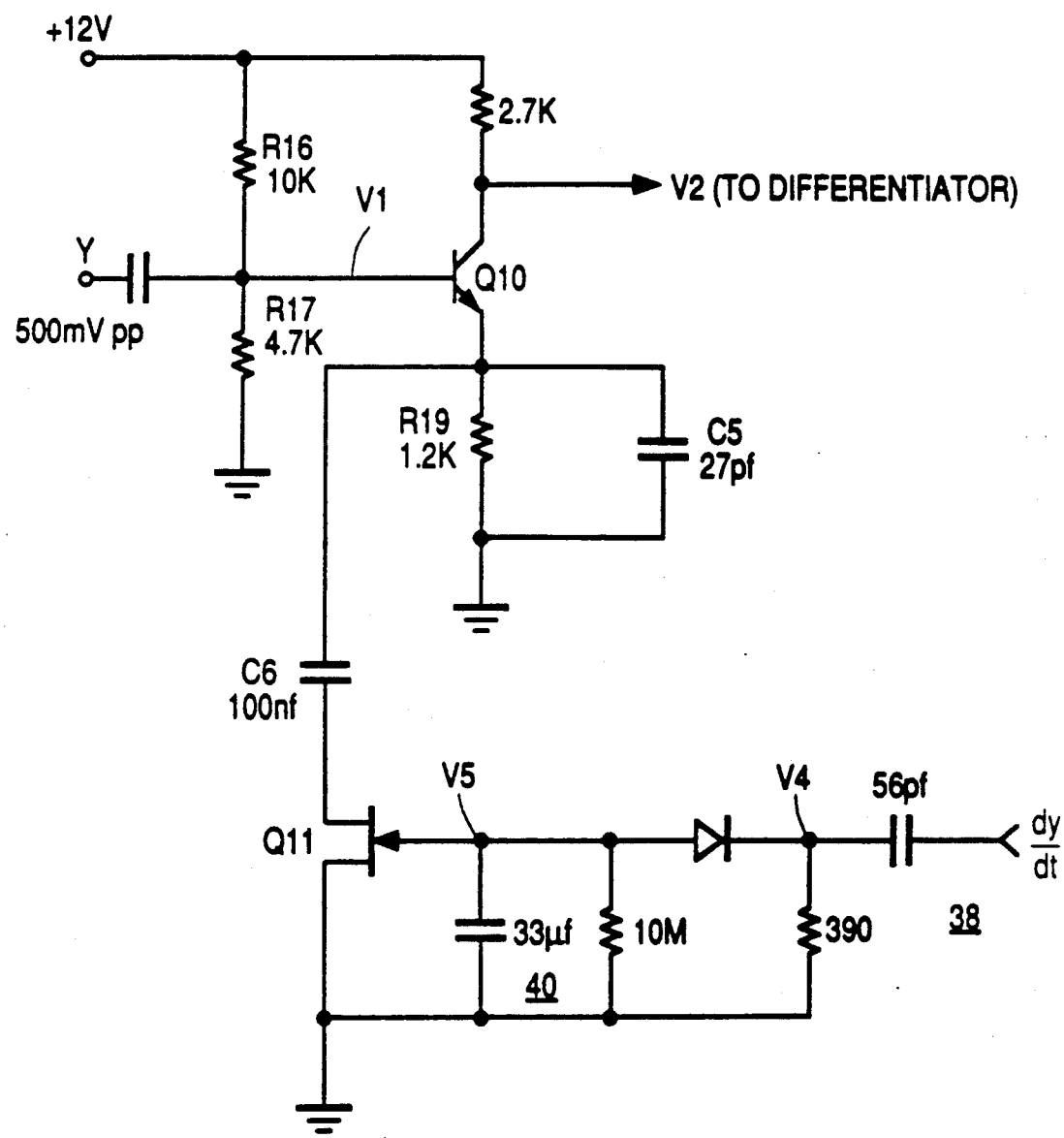
FIG. 8 is a schematic diagram of an alternative amplifier with a variable gain output, for use in a BSVM circuit as shown in FIG. 7.

An alternative embodiment for an amplifier with a variable gain output is shown in FIG. 8. Transistor Q10 is a variable gain amplifier. The DC bias for the base of transistor Q10 is determined by resistors R16 and R17. The AC gain of transistor Q10 is determined by the emitter load. The range of the emitter load is fixed by resistor R19, and shaped at very high frequencies by capacitor C5. A J-FET transistor Q11 is coupled to the emitter of transistor Q10, in parallel with resistor R19 and capacitor C5, by capacitor C6. Transistor Q11 functions as a variable resistor, varying the emitter load of transistor Q10 responsive to signal V5 generated by integrator 40. Integrator 40 is responsive to the second differentiator 38, which is itself responsive to the first derivative ($dY/dt$) of the luminance signal. The variably amplified luminance signal V2 is an input to the first differentiating circuit, not shown.

Figure 6:
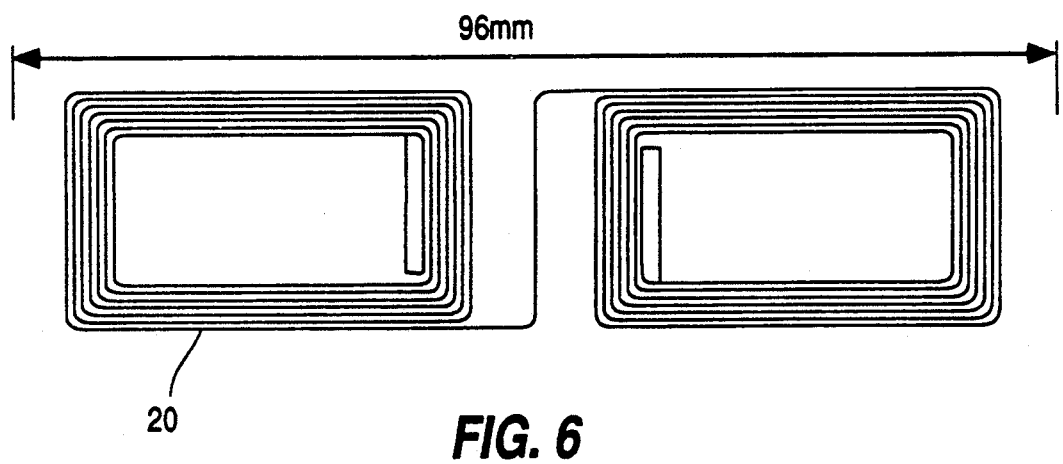
FIG. 6 is a diagram of an auxiliary yoke for BSVM.

FIG. 6 shows the auxiliary yoke 20. It consists of a rectangular coil printed on mylar foil. This foil is wrapped around the neck of the tube in front of the gun assembly under the main yoke, as shown in FIG. 1. The auxiliary yoke has the following specifications, for a 70 cm screen at 27.5 KV:

conductor width: 0.13 mm;
conductor spacing: 0.13 mm;
printed circuit material: Mylar foil 0.09 mm;
copper layer: 35µ;
number of turns: 7 each side;
inductance: 5.6 µH;
resistance: 2.5 Ω; and,
sensitivity:
3.3 mm/A at screen center; and,
6 mm/A at ends of horizontal axis.

A yoke with a high inductance has high sensitivity (mm/A) and requires only a small driving current. The resonant frequency of the resonant circuit, formed by the yoke and parasitic capacitances, will decrease with increasing coil inductance. This resonant frequency has to be, at the least, higher than the video bandwidth to ensure correct BSVM operation. The inductance value is chosen as a compromise between these two contradictory requirements.

The auxiliary yoke signal should coincide within ±30 nsec with the video signal at the picture tube cathode. The delay of the video signal from the take off point to the cathode will be about 60 nsec in a 100 Hz field frequency receiver. The delay of the proposed BSVM circuit amounts to about 75 nsec.

High frequency noise, for example greater than 10 MHz, will be accentuated in the BSVM signal due to the differentiator. Since the auxiliary yoke is driven by a collector and becomes more resistive with increasing frequency, this noise will cause radiation in the lower frequency bands. This can be avoided by bypassing the high frequency currents with a capacitor C4 connected in parallel to the yoke. As long as only frequencies over 10 MHz are bypassed, correct BSVM is maintained, since the video signal has a bandwidth of only 10 MHz. However, capacitor C4 and the yoke and parasitic capacitances form a parallel resonant circuit with a resonant frequency of about 9 MHz. Therefore, a damping resistor R9 is connected in parallel with the yoke to avoid resonant currents. These currents would produce ringing after transients in the picture.

The supply wires to the yoke are the main source of radiation. The supply wires should be short in the interest of reducing radiation. This means that at least the output stage of the circuit should be placed somewhere on the neck of the picture tube or on the socket printed circuit board (PCB) together with the video amplifier. The radiation of the auxiliary yoke itself is not critical since it is shielded quite well by the main yoke.

The power consumption of the low level signal processing circuit amounts to about 0.5 W, that is for example, about 50 mA at 12 volts).

The output stage has no static power dissipation except the 250 mW of the biasing network. This is due to the push-pull operation without quiescent current. The power consumption therefore varies considerably with picture content. The total dissipation amounts to about 0.5 W for normal television program material and rises to about 1 W worst case with full screen multiburst or noise. Resistor R10 limits the maximum possible power consumption of the output stage to about 2 W to protect transistors Q8 and Q9.

The video signal dependent gain of the BSVM circuit not only improves the resolution in test patterns, but also in pictures having a small number of high frequency signal components. The coring operation prevents noise and ringing from deteriorating the displayed picture. The circuit described can easily be incorporated into existing receiver designs without any need for circuit changes. No alignment is required.

What is claimed is:

1. A deflection system, comprising:
   means for deflecting an electron beam for modulating beam scan velocity of said electron beam;
   gain adjustable means responsive to a component of a video signal for generating a beam scan velocity modulating signal;
   amplifying means responsive to said beam scan velocity modulating signal for driving said deflecting means; and,
   control means responsive to said beam scan velocity modulating signal for generating a gain control signal for said gain adjustable means.

2. The system of claim 1, wherein said gain varies with the frequency content of said component of said video signal.

3. The system of claim 1, wherein said gain varies inversely with the frequency content of said video signal component.

4. The system of claim 1, wherein said beam scan velocity modulating signal is indicative of the first derivative of said video signal component and said gain control signal is indicative of the second derivative of said video signal component.

5. The system of claim 1, wherein said gain adjustable means comprises second amplifying means and a first differentiator and said control means comprises a second differentiator and an integrator.

6. A deflection system, comprising:
   means for generating a deflection signal adjustable in amplitude responsive to a video signal component;
   means for modulating beam scan velocity of an electron beam responsive to said deflection signal; and, means for generating an amplitude control signal for adjusting said amplitude of said deflection signal in a manner indicative of variation of frequency content of said video signal component.

7. The system of claim 6, wherein said deflection signal generating means comprises:
amplitude adjusting means for said video signal component; and,
means for generating a derivative of said amplitude adjusted video signal component.

8. The system of claim 7, wherein said amplitude adjusting means comprises variable amplifying means.

9. The system of claim 7, wherein said amplitude adjusting means comprises variable attenuating means.

10. The system of claim 6, wherein said deflection signal generating means comprises:
means for generating a derivative of said video signal component; and,
amplitude adjusting means for said derivative of said video signal component.

11. The system of claim 10, wherein said amplitude adjusting means comprises variable amplifying means.

12. The system of claim 10, wherein said amplitude adjusting means comprises variable attenuating means.

13. The system of claim 6, wherein said means for generating said amplitude control signal is responsive to said deflection signal.

14. The system of claim 6, wherein said means for generating said amplitude control signal comprises means for generating an intermediate signal which is indicative of a derivative of said deflection signal.

15. The system of claim 6, wherein said means for generating said amplitude control signal comprises:
means for generating an intermediate signal which is indicative of a derivative of said deflection control signal; and,
peak detecting means responsive to said intermediate control signal.

16. A deflection system, comprising:
means for differentiating and adjusting in amplitude a luminance component of a video signal;
first means responsive to said amplitude adjusted, differentiated luminance component for modulating beam scan velocity of an electron beam; and,
second means responsive to said amplitude adjusted, differentiated luminance component for generating a signal indicative of the frequency content of said luminance component for controlling said amplitude adjusting.

17. The system of claim 16, wherein said signal generating means comprises means for further differentiating and for integrating said differentiated luminance component.

18. The system of claim 16, wherein said modulating means comprises an auxiliary horizontal deflection yoke.

19. The system of claim 16, wherein said amplitude adjustment of said luminance component varies inversely with said frequency content.

20. The system of claim 16, wherein said differentiating and amplitude adjusting means comprises a variable gain amplifier.

21. The system of claim 16, wherein said luminance component is differentiated twice.

22. The system of claim 16, comprising:
first differentiating means for differentiating said luminance component;
second differentiating means for differentiating said differentiated component; and,
means for integrating said twice differentiated component.

23. A deflection system, comprising:
means for generating a deflection signal adjustable in amplitude and indicative of a derivative of a video signal component;
means for modulating beam scan velocity of an electron beam responsive to said deflection signal; and,
means for generating an amplitude control signal for adjusting said amplitude of said deflection signal in a manner indicative of a derivative of said deflection signal.

24. The system of claim 23, wherein said modulating means comprises an auxiliary horizontal deflection yoke.

25. The system of claim 23, wherein said amplitude of said deflection signal varies inversely with high frequency content of said video signal component.

26. A deflection system, comprising:
means for modulating beam scan velocity of an electron beam responsive to a deflection signal indicative of the frequency content of a video signal component;
differentiating and integrating means for generating an amplitude control signal having a first rate of change responsive to an increase of high frequency content of said video signal component and a second rate of change, different from said first rate of change, responsive to a decrease of said high frequency content; and,
means for variably amplifying said deflection signal responsive to said amplitude control signal.

27. The system of claim 26, wherein said amplitude control signal is proportional to the negative peak amplitude of the second derivative of the luminance component of said video signal.

28. The system of claim 26, wherein said amplitude control signal changes more rapidly responsive to an increase of said high frequency content than to a decrease of said high frequency content.

29. A deflection system, comprising:
means for generating a deflection signal for modulating beam scan velocity of an electron beam responsive to a first derivative of a component of a video signal;
a feedback circuit for generating a correction signal indicative of the rate of change of said deflection signal; and,
means for variably amplifying said deflection signal responsive to said correction signal, said feedback circuit having a sufficiently large time constant relative to level transitions of said video signal component that said deflection signal corresponds to said first derivative of said video signal component independent of said variable amplification.

30. The system of claim 29, wherein said correction signal is indicative of a second derivative of said component of said video signal.

31. The system of claim 29, wherein said feedback circuit comprises means for generating a second derivative of said component and integrating said second derivative.

32. The system of claim 31, wherein said correction signal is proportional to a negative peak amplitude of said second derivative of said component of said video signal.

33. The system of claim 29, wherein said video component is luminance.

34. The system of claim 29, wherein said time constant is greater than one field period.

* * * * *

UNITED STATES PATENT AND TRADEMARK OFFICE
CERTIFICATE OF CORRECTION

PATENT NO. : 5,179,320

DATED : January 12, 1993

INVENTOR(S) : Luc Tripod, Zurich, Switzerland

It is certified that error appears in the above-identified patent and that said Letters Patent is hereby corrected as shown below:

In Column 6, line 49 (Claim 1), after signal insert --, indicative of the second derivative of said video signal component,--

In Column 6, line 57 (Claim 4), after the delete [first]

In Column 6, line 59 (Claim 4), after the delete [second]

In Column 6, line 60 (Claim 4), after said insert --beam scan velocity modulating--

In Column 6, line 60 (Claim 4), delete [video]

In Column 6, line 60 (Claim 4), delete [component]

In Column 6, line 67 (Claim 6), after component insert --having variable frequency content--

In Column 7, line 5 (Claim 6), after indicative of insert -- the rate of change of said variable--

In Column 7, line 5 (Claim 6), delete [variation of]

In Column 7, line 47 (Claim 16), after indicative of insert --a further derivative of --

In Column 7, line 47 (Claim 16), delete [the frequency content of]

In Column 7, line 47 (Claim 16), after said insert --differentiated--

UNITED STATES PATENT AND TRADEMARK OFFICE
CERTIFICATE OF CORRECTION

PATENT NO. : 5,179,320

DATED : January 12, 1993

INVENTOR(S) : Luc Tripod, Zurich, Switzerland

It is certified that error appears in the above-identified patent and that said Letters Patent is hereby corrected as shown below:

In Column 7, line 51 (Claim 17), after means for delete [further differentiating and for]

In Column 7, line 52 (Claim 17), after said insert --further--

In Column 7, line 39 (Claim 15), after intermediate delete [control]

Signed and Sealed this

Twenty-third Day of May, 1995

Attest:

BRUCE LEHMAN

Attesting Officer    Commissioner of Patents and Trademarks